United States Patent
Thomson

(10) Patent No.: US 12,466,009 B2
(45) Date of Patent: Nov. 11, 2025

(54) PIPELINE CLAMP ALIGNMENT DEVICE

(71) Applicant: Kyle Harvey Thomson, Bonnyville (CA)

(72) Inventor: Kyle Harvey Thomson, Bonnyville (CA)

( * ) Notice: Subject to any disclaimer, the term of this patent is extended or adjusted under 35 U.S.C. 154(b) by 351 days.

(21) Appl. No.: 18/154,014

(22) Filed: Jan. 12, 2023

(65) Prior Publication Data
US 2024/0238917 A1 Jul. 18, 2024

(51) Int. Cl.
*B23K 37/0533* (2025.01)

(52) U.S. Cl.
CPC ............................. *B23K 37/0533* (2013.01)

(58) Field of Classification Search
CPC .................................................. B23K 37/0533
See application file for complete search history.

(56) References Cited

U.S. PATENT DOCUMENTS

| | | | | |
|---|---|---|---|---|
| 3,952,936 | A * | 4/1976 | Dearman | F16L 13/02 269/287 |
| 5,865,430 | A * | 2/1999 | Conover | B23K 37/0533 29/272 |
| 6,161,296 | A * | 12/2000 | Davio | B23K 37/0426 269/80 |
| 2003/0137092 | A1 * | 7/2003 | Melanson | B25B 27/16 269/43 |
| 2013/0067709 | A1 * | 3/2013 | Bender | B25B 5/147 29/272 |
| 2015/0000091 | A1 * | 1/2015 | Bender | B25B 5/147 29/272 |
| 2017/0036309 | A1 * | 2/2017 | McClure | B23K 37/0533 |
| 2018/0117718 | A1 * | 5/2018 | Rajagopalan | B23K 9/0284 |

OTHER PUBLICATIONS

Gazovikpipe mini-fit clamp online product page dated by web.archive.org at Aug. 2, 2021, https://gazovikpipe.ru/mini-centrator-mini-fit-clamp-ssha (Year: 2021).*

(Continued)

*Primary Examiner* — Terrell L McKinnon
*Assistant Examiner* — Ding Y Tan
(74) *Attorney, Agent, or Firm* — Orin Del Vecchio

(57) ABSTRACT

A pipeline clamp alignment device that is configured to be operably coupled to a pipeline clamp that is surroundably mounted to a pipeline wherein the present invention provides leverage to facilitate minor adjustments to the pipeline. The present invention includes a first embodiment and a second embodiment wherein both embodiments are configured to operably couple to a portion of a pipeline clamp. The first embodiment leverages a second section to be placed intermediate the clamp and the pipeline wall. A second embodiment is configured to slidably engage the clamp from above and employs a fastener to secure the body thereof in place on the clamp. Both the first embodiment and second embodiment utilize an adjustment member that is movably secured to the first embodiment and second embodiment. The adjustment member functions to bias against a wall of a pipeline and facilitate movement thereof.

4 Claims, 2 Drawing Sheets

(56) References Cited

OTHER PUBLICATIONS

Gazovikpipe accessories for chain alignment centralizer D230 and D230SS product page dated by web.archive.org at Jul. 29, 2017 https://gazovikpipe.ru/komplektuyushhie-dlya-czepnyix-czentratorov (Year: 2017).*

KC welding 18" alignment ratchet clamp online product page dated by web.archive.org at May 12, 2021 https://www.kcwelding.com/20-ratchet-clamp-copy (Year: 2021).*

Mathey Dearman fit-up pro spacing wedges online product page, dated by web.archive.org at Oct. 5, 2022, https://www.fit-up-pro.com/Products/Fit-up-and-Alignment-Tools/spacing-wedges (Year: 2022).*

Sawyer jackscrew wedge online product page from Sawyer Manufacturing company, web.archive.org dated to be Aug. 3, 2020, https://sawyermfg.com/equipment/jack-screw-wedge/ (Year: 2020).*

* cited by examiner

PIPELINE CLAMP ALIGNMENT DEVICE

FIELD OF THE INVENTION

The present invention relates generally to pipeline welding, more specifically but not by way of limitation, a pipeline clamp alignment device that is configured to be operably coupled to a pipeline clamp that is surroundably mounted to a pipe wherein the present invention functions to provide alignment of the pipe ends disposed within the pipeline clamp.

BACKGROUND

Welding pipes whether for pipeline, boilers or other industrial applications is an incredibly difficult task. The smallest variations in length, wall thickness, and ovality make the joining of two pipe end a challenge but must be done within critical measurements in order to ensure pipeline integrity. While these imperfections can be minimized, they can never be prevented or avoided. Pipe imperfection often are presented during what is referred to as the, fit-up, wherein the pipes are initially aligned in preparation for joining thereof. In the fit-up parameters can impact the pipe causing misalignment, sometimes known as hi-lo. There are steps that are commonly practiced in order to achieve the best fit-up possible. A proper fit-up is especially important for applications using an automated process such as orbital welding. Industry data describes misalignment as the difference between the internal and/or external heights of two pipes. Poor alignment causes a weaker weld that is less able to cope under high fatigue conditions which will result in premature failure of the pipeline.

It is common that misalignment occurs when the fittings being welded to the pipes are made to different dimensional tolerances. If the tube or fitting is out-of-round, if the outer diameter or wall thicknesses differ, this will produce some misalignment. Misalignment results in a ridge on the inside of the weld that can interfere with the function of the piping system and can cause negative effects such as but not limited to liquid accumulation that promotes corrosion and contamination. Misalignment is more common in larger pipe sizes such as but not limited to six inches and above. Larger pipes are more likely to be out of round or to become warped during storage or transit. When attempting to resolve misalignment there is not one industry solution as different applications require different techniques. One common technique is to utilize beveling. Beveling is the process of removing material from the tube or pipe end. This is primarily done by counterboring. By removing material with a bevel it creates a landing to align the pipe ends for a better fit-up. Another common technique to align pipes is alignment clamps. Common clamps such as cage clamps are surroundably mounted on opposing sides of the pipe ends and are used to attempt alignment. While these clamps are somewhat effective, it is common to employ drift pins, which are essentially wedge-shaped objects to further ensure alignment of the pipe end after the clamp is in position. Drift pins are less than exact and can take a significant amount of time to put in position.

Accordingly, there is a need for a pipeline clamp alignment device that operably couples to a pipeline clamp and provides an ability to provide small adjustments to the pipe end positions so as to ensure a proper alignment prior to the welding thereof.

SUMMARY OF THE INVENTION

It is the object of the present invention to provide a pipeline clamp adjustment device that is configure to be operably coupled to a pipeline clamp being employed to align pipe ends wherein the present invention includes a first embodiment and a second embodiment.

Another object of the present invention is to provide a pipeline clamp adjustment device that slidably couples onto a pipeline clamp that is surroundably mounted to a pipe wherein the first embodiment includes a body that is configured to have a portion thereof placed intermediate the pipe wall and the pipeline clamp.

A further object of the present invention is to provide a pipeline clamp adjustment device that is configure to be operably coupled to a pipeline clamp being employed to align pipe ends wherein the second embodiment of the present invention has a body configured to slide over the top of the pipeline clamp.

Yet a further object of the present invention is to provide a pipeline clamp adjustment device that slidably couples onto a pipeline clamp that is surroundably mounted to a pipe wherein the first embodiment and second embodiment include an adjustment member that is configured to be biased against the outer wall of the pipe.

Still another object of the present invention is to provide a pipeline clamp adjustment device that is configure to be operably coupled to a pipeline clamp being employed to align pipe ends wherein the body of both the first embodiment and second embodiment are manufactured from metal.

An additional object of the present invention is to provide a pipeline clamp adjustment device that slidably couples onto a pipeline clamp that is surroundably mounted to a pipe wherein the second embodiment includes a securing member configured to secure the body of the send embodiment to a portion of the pipeline clamp.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
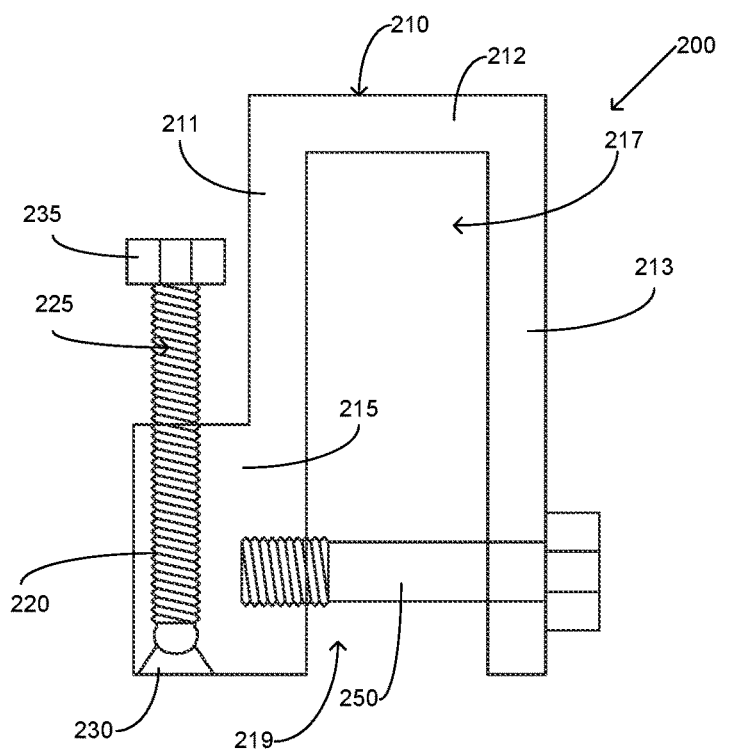
FIG. 1 is a side view of the second embodiment of the present invention.
Figure 2:
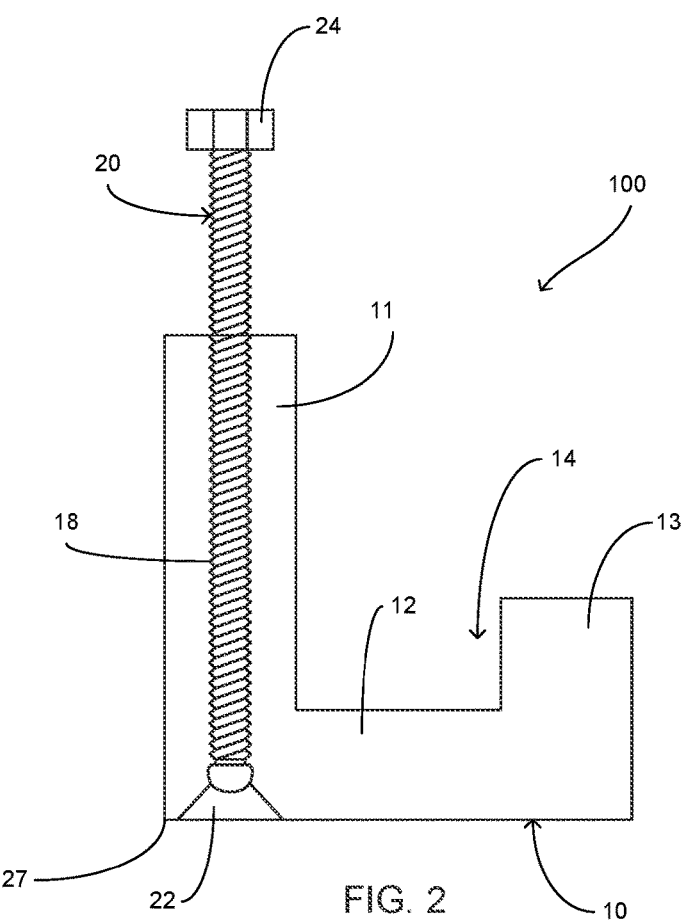
FIG. 2 is a side view of the first embodiment of the present invention.
Figure 3:
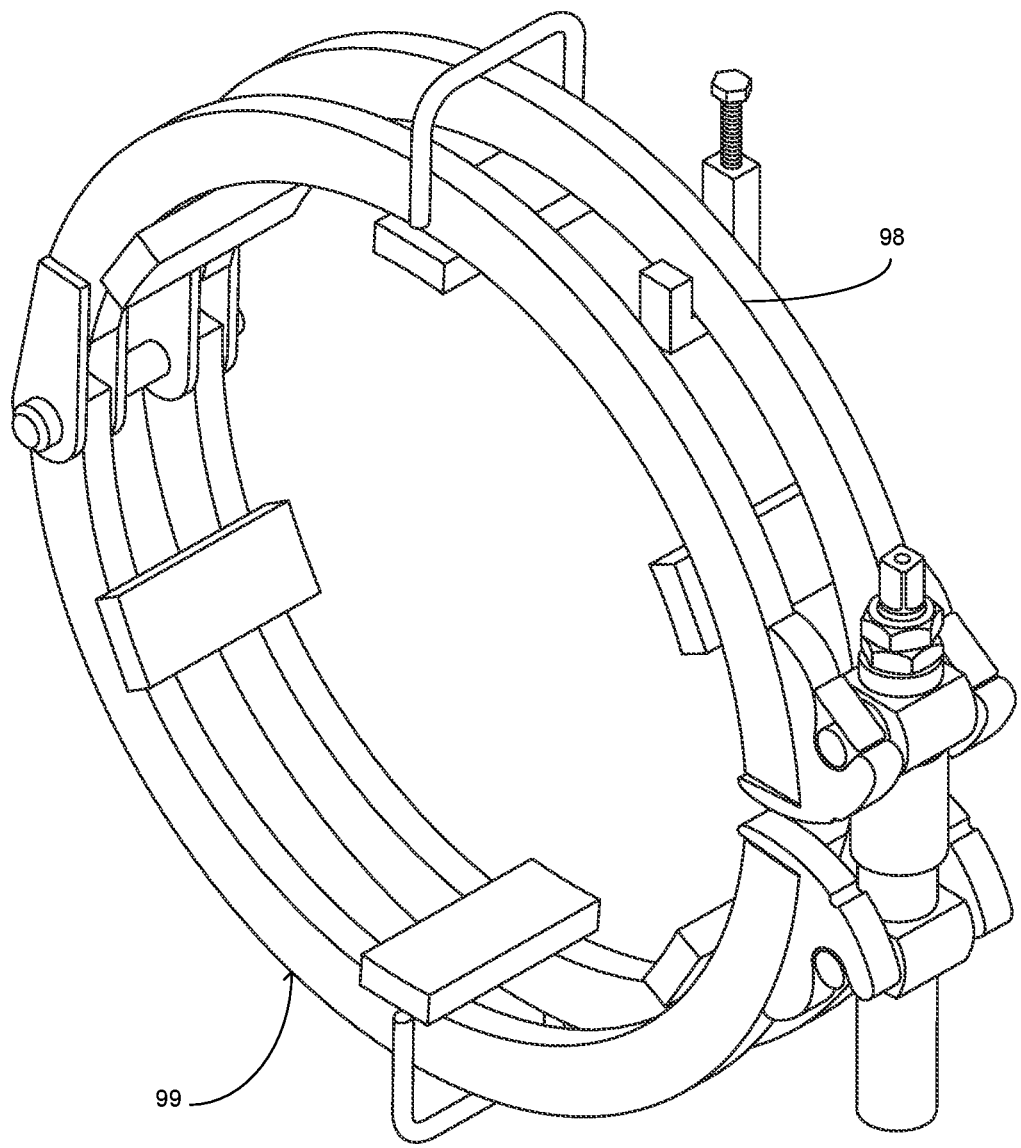
FIG. 3 is a perspective view of the first embodiment of the present invention operably coupled to a pipeline clamp.

Referring now to the drawings submitted herewith, wherein various elements depicted therein are not necessarily drawn to scale and wherein through the views and figures like elements are referenced with identical reference numerals, there is illustrated a pipeline clamp alignment device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the pipeline clamp alignment device 100 includes a body 10. The body 10 is manufactured from a durable rigid material such as but not limited to metal. The body 10 is comprised of a first section 11, second section 12 and third section 13. The first section 11, second section 12 and third section 13 are integrally formed utilizing suitable techniques. The second section 12 is intermediate the first section 11 and third section 13 being perpendicular therewith. Both the first section 11 and third section 13 extend upward from the second section 12 and are formed at opposed ends of the second section 12. The third section 13 has a height that is less than that of the first section 11. The lower height of the third section 13 enables the pipeline clamp alignment device 100 to be placed underneath a portion of the exemplary pipeline clamp 99 wherein the second section 12 is adjacent a pipeline wall and the clamp portion 98 is retained within the void 14 to ensure no movement of the pipeline clamp alignment device 100 during use thereof.

The first section 11 has a greater height than the third section 13 so as to accommodate movement of the adjustment member 20. The adjustment member 20 is movably coupled within passage 18 formed in the first section 11 wherein the passage 18 extends the length of the first section 11. The adjustment member 20 includes bottom member 22 that is operably coupled to the lower end of the adjustment member 20. The bottom member 22 is formed to engage the wall of a pipe and inhibit any damage thereto. The bottom member 22 is moved downwards from the lower edge 27 of the first section 11 utilizing a tool configured to turn head 24. The threaded outer surface of the adjustment member 20 facilitates rotational movement thereof through the passage 18 and the upwards-downwards movement of the bottom member 22. Bottom member 22 applies pressure to an adjacent pipe wall so as to provide fractional movement thereof.

A second embodiment of the pipeline clamp alignment device 200 is illustrated herein in FIG. 1. The second embodiment of the pipeline clamp alignment device 100 functions similarly to the first embodiment of the pipeline clamp alignment device 100 but is designed to slip over clamp portion 98 instead of underneath when operably coupling the pipeline clamp alignment device 200 to the pipeline clamp 99. The pipeline clamp alignment device 200 includes a body 210 that is manufactured from a durable rigid material such as but not limited to metal. The body 210 includes a first section 211, second section 212 and third section 213. The second section 212 is intermediate the first section 211 and third section 213 and is perpendicular therewith. The first section 211 and third section 213 extend downward from the second section 212 from opposing ends thereof forming void 217. The first section 211 has contiguously formed therewith an adjustment member block 215. Adjustment member block 215 includes passage 220 having adjustment member 225 movably mounted therein. The adjustment member 225 includes bottom member 230 that will engage a wall of a pipeline to which a pipeline clamp 99 is surroundably mounted thereto. The adjustment member 225 is rotatably moved through engagement of head member 235 wherein head member 235 is engaged through utilization of an appropriate tool.

Void 217 is configured to slide over clamp portion 98 wherein the second section 212 will be superposed thereto. The formation of the void 217 places the first section 211 and third section 213 on opposing sides of the clamp portion 98 to inhibit movement of the pipeline clamp alignment device 200 subsequent being operably coupled therewith. Fastener 250 is present and is operably coupled to the third section 213 and the lower end of the first section 211. The fastener 250 is a conventional bolt and is deployed so as to extend underneath clamp portion 98 and have an end thereof secured into the first section 211 so as to inhibit movement of the pipeline clamp alignment device 200 subsequent being operably coupled to the pipeline clamp 99. Fastener 250 is illustrated herein in its second position wherein in the second position the fastener is secured to the first section 211. In the first position of the fastener 250, the fastener 250 is removed from the first section 211 so as to allow the clamp portion 98 to enter the opening 219 to void 217.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A pipeline clamp alignment device that is configured to be operably coupled to a pipeline clamp surroundably mounted to a pipeline so as to facilitate alignment of the pipeline wherein the pipeline clamp alignment device comprises:

a body, said body having a first section, a second section and a third section, said second section being intermediate said first section and said third section, said second section being perpendicular with said first section and said third section, said first section extending downward from said second section proximate a first end thereof, said third section extending downward from said second section proximate a second end thereof;

a void, said void being intermediate said first section and said third section above said second section;

an adjustment member block, said adjustment member block being integrally formed with said first section of said body opposite said void, said adjustment member block having an adjustment member, said adjustment member being movably mounted within said adjustment member block, said adjustment member having a bottom member configured to be biased against a wall of the pipeline;

a fastener, said fastener being operably coupled to said third section and configured to extend across said void and removably connect with a lower end of said first section of said body, the fastener oriented in a plane perpendicular to the adjustment member.

2. The pipeline clamp alignment device as recited in claim 1, wherein said adjustment member block further includes a passage formed therethrough, said passage configured to have the adjustment member operably coupled therein.

3. The pipeline clamp alignment device as recited in claim 2, wherein said second section is superposed a portion of the pipeline clamp subsequent operable coupling of the pipeline clamp alignment device to a pipeline clamp.

4. The pipeline clamp alignment device as recited in claim 1, wherein said adjustment member further includes a head member, said head member being opposite said bottom member, said head member configured to be operably coupled with a tool so as to facilitate rotational movement of said adjustment member.

* * * * *